US011061996B2

(12) United States Patent
Stecklina et al.

(10) Patent No.: US 11,061,996 B2
(45) Date of Patent: Jul. 13, 2021

(54) INTRINSIC AUTHENTICATION OF PROGRAM CODE

(71) Applicant: IHP GmbH—Innovations for High Performance Microelectronics/Leibniz-Institut Fur Innovative Mikroelektronik, Frankfurt (DE)

(72) Inventors: Oliver Stecklina, Cottbus (DE); Peter Langendorfer, Frankfurt (DE)

(73) Assignees: IHR GMBH—INNOVATIONS FOR HIGH PERFORMANCE MICROELECTRONICS; LEIBNIZ-INSTITUT FUR INNOVATIVE MIKROELEKTRONIK

( * ) Notice: Subject to any disclaimer, the term of this patent is extended or adjusted under 35 U.S.C. 154(b) by 709 days.

(21) Appl. No.: 15/546,803

(22) PCT Filed: Jan. 28, 2016

(86) PCT No.: PCT/EP2016/051756
§ 371 (c)(1),
(2) Date: Oct. 3, 2017

(87) PCT Pub. No.: WO2016/120362
PCT Pub. Date: Aug. 4, 2016

(65) Prior Publication Data
US 2019/0384894 A1    Dec. 19, 2019

(30) Foreign Application Priority Data
Jan. 28, 2015    (DE) .................... 10 2015 201 430.4

(51) Int. Cl.
H04L 29/06    (2006.01)
G06F 21/12    (2013.01)
H04L 9/06    (2006.01)

(52) U.S. Cl.
CPC .......... *G06F 21/125* (2013.01); *H04L 9/0637* (2013.01); *H04L 9/0662* (2013.01); *H04L 63/0435* (2013.01); *H04L 2209/12* (2013.01)

(58) Field of Classification Search
CPC ... G06F 21/125; H04L 9/0637; H04L 9/0662; H04L 63/0435
(Continued)

(56) References Cited

U.S. PATENT DOCUMENTS 4,168,396 A    9/1979 Best
4,278,837 A    7/1981 Best
(Continued)

OTHER PUBLICATIONS

US 2010/0122095 A1, 05/2010, Jones et al. (withdrawn)
(Continued)

*Primary Examiner* — Dereena T Cattungal
(74) *Attorney, Agent, or Firm* — Ware, Fressola, Maguire & Barber LLP

(57) ABSTRACT

A cryptoprocessor has a processor core for receiving and executing instructions of a program code based on a program flow chart, a program memory unit which stores the program code with instructions in an individually encrypted format, wherein the respective instructions contain at least one instruction data word and an instruction data key allocated to the respective instruction, a respective instruction is encrypted using a program data key and the instruction data key of a respective preceding instruction, which is to be executed immediately beforehand in accordance with the program flow chart, and wherein the same instruction data key is allocated to the corresponding possible preceding instructions only in the event that a corresponding instruc-
(Continued)

tion in the program flow chart has a plurality of possible preceding instructions, the respective instruction data keys otherwise being unique to the instruction. A decryption unit is also described.

14 Claims, 4 Drawing Sheets

(58) Field of Classification Search
USPC .......................................................... 713/190
See application file for complete search history.

(56) References Cited

U.S. PATENT DOCUMENTS

| | | | |
|---|---|---|---|
| 4,562,305 A | 12/1985 | Gaffney, Jr. | |
| 6,061,449 A | 5/2000 | Candelore et al. | |
| 2002/0120838 A1* | 8/2002 | Abdulkader | H04L 9/12 713/153 |
| 2002/0154769 A1* | 10/2002 | Petersen | G06F 7/586 380/42 |
| 2003/0095659 A1* | 5/2003 | Ishihara | H04L 9/001 380/46 |
| 2008/0033960 A1* | 2/2008 | Banks | G06F 21/6227 |
| 2008/0092239 A1* | 4/2008 | Sitrick | H04N 21/4627 726/27 |
| 2008/0263366 A1 | 10/2008 | Mauruthi | |
| 2010/0002868 A1* | 1/2010 | Willoughby | H04L 9/0637 380/28 |
| 2010/0153745 A1* | 6/2010 | Onno | G06F 21/125 713/190 |
| 2010/0332843 A1* | 12/2010 | Boivie | G06F 21/125 713/189 |
| 2011/0085657 A1* | 4/2011 | Matthews, Jr. | G06F 12/1408 380/28 |
| 2011/0103580 A1* | 5/2011 | Hazay | H04L 9/32 380/28 |
| 2011/0296203 A1* | 12/2011 | Henry | G06F 12/0875 713/190 |
| 2013/0259225 A1* | 10/2013 | Onoda | H04L 9/0618 380/28 |
| 2015/0006905 A1* | 1/2015 | Avanzi | H04L 9/0618 713/189 |
| 2016/0020903 A1* | 1/2016 | de Perthuis | H04L 9/0637 380/44 |
| 2017/0214523 A1* | 7/2017 | Pebay-Peyroula | H04L 9/0668 |
| 2018/0205536 A1* | 7/2018 | Tomlinson | H04L 9/0656 |

OTHER PUBLICATIONS

Frederik Armknecht, et al; "A security framework for the analysis and design of software attestation"; Computer & Communications Security; Nov. 4, 2013; pp. 1-12.

"Block ciper mode of Operation"; From Wikipedia, the free encyclopedia; Jan. 3, 2015; pp. 1-12.

Ali Jose Mashtizadeh, et al; "Cryptographically Enforced Control Flow Integrity Computing Research Repository"; vol. 1408, 1451; 2014; pp. 1-15.

R. Elbaz, et al; "Hardware Engines for Bus Encryption: a Survey of Existing Techniques"; IEEE 2005; whole document.

\* cited by examiner

INTRINSIC AUTHENTICATION OF PROGRAM CODE

CROSS REFERENCE TO RELATED APPLICATIONS

This application is the U.S. National Stage of International Application Number PCT/EP2016/051756 filed on Jan. 28, 2016, which application claims priority under 35 USC § 119 to German Patent Application No. 10 2015 201 430.4 filed on Jan. 28, 2015. Both applications are hereby incorporated by reference in their entirety.

TECHNICAL FIELD/BACKGROUND OF THE INVENTION

With the increasing importance and general availability of embedded systems, there is also a growing need for security and reliability for such systems. Embedded systems use microcontrollers with low power consumption, also called low-power microcontrollers.

Currently available and used low-power microcontrollers employ a simple von Neumann or Harvard architecture having a single address space. Security mechanisms in particular, but also mechanisms for implementing reliable systems are essentially non-existent in this class of microcontrollers.

U.S. Pat. No. 4,278,337 describes a crypto-microprocessor in which program code is stored in ciphered form in memory and when executed is deciphered in blocks with the aid of a key stored in a memory. The key is stored before the crypto-microprocessor is distributed to users. An individual key is generated for each block address by combining the stored key with the respective block address using an exclusive OR gate (column 8, lines 3 ff.).

This architecture was implemented by Dallas in the DS5002FP chip. The processor uses three functions, ED, EA and ED-1, where ED refers to 8-bit data encryption, EA to 17-bit is address encryption and ED-1 to 8-bit data decryption. The operations are encrypted as follows: d'=EDa,K(d), where a is the address and K is, the (48-bit) master key. The data are then stored at address a'=EAK(a). The key is stored in a battery-buffered RAM, which is erased in the event of tampering.

Return-to-libc is the name given to a method for attacking computers, in which the computer can be exploited by an attacker in order to execute undesired program code. In return-to-libc attacks, the program stack of a processor is manipulated. The program stack, manages return addresses from program subroutines, among other functions. By manipulating the program stack, a modified program sequence can be generated which allows a sequence of instructions desired by an attacker to be executed, instead of the normal sequence according to a desired program flow chart on which the program code to be executed is based. Due to the fact that such an attack does not require any external code, but merely uses program code which is already available on the processor, most of the standard protective mechanisms are inadequate.

SUMMARY OF THE INVENTION

According to a first aspect of the present invention, a cryptoprocessor is proposed, comprising
a processor core for receiving and executing instructions of a program code based on a program flow chart;
a program memory unit which stores the program code with instructions in an individually encrypted format, wherein the respective instructions contain at least one instruction data word and an instruction data key allocated to the respective instruction, and a respective instruction is encrypted using a program data key and the instruction data key of a respective preceding instruction, which is to be executed immediately beforehand in accordance with the program flow chart, and wherein the same instruction data key is allocated to the corresponding possible preceding instructions only in the event that a corresponding instruction in the program flow chart has a plurality of possible preceding instructions, the respective instruction data keys otherwise being unique to the instruction; and
a decryption unit which is configured to receive the encrypted instructions from the program memory unit and to decrypt a respective received encrypted instruction using the program data key and the instruction data key of the corresponding preceding instruction, to transfer the at least one currently decrypted data word of the instruction to the processor core for executing the instruction, and to have the currently thus decrypted instruction data key available to be used in the decryption of the next received encrypted instruction.

In the cryptoprocessor of the present invention, the individual instructions of the program code are encrypted in such a way that an instruction can be used by the processor core only if the instruction preceding it, referred to here as the preceding instruction, was executed immediately beforehand. According to the invention, this requires that the preceding instructions were first decrypted and thus that the instruction data key contained therein is available to decrypt the current instruction.

This cryptographic linkage between the instructions produces a dependence that gives the processor core an intrinsic ability to verify that the instructions are executed in the correct order in accordance with the desired program flow chart on which the program code is based. This is because instruction n+1 according to the program flow chart can be executed only on condition that instruction n according to the program flow chart was executed beforehand. If there is any departure from the predefined program flow chart, the processor core will inevitably be given wrongly decrypted instructions which it cannot interpret and which therefore it is inevitably incapable of executing. This cryptographic linkage between the instructions produces a dependence that results in verifiability of the correct order of program instructions being an intrinsic characteristic of the processor core. For that reason, the concept implemented in this manner is also referred to as intrinsic code attestation (ICA). In order to defend against the return-to-libc attacks mentioned above, ICA ensures that there can be no departure during program execution from the program path defined by the program flow chart and implemented in the program code.

Embodiments of the cryptoprocessor shall now be described by way of example.

In one embodiment, the decryption unit is configured to provide the currently decrypted instruction, i.e., the at least one decrypted instruction data word, individually to the processor core for execution, and to not decrypt a next instruction until after the processor core has begun to execute the instruction provided immediately beforehand. In this way, instructions are not decrypted until immediately before they are executed by the processor core, so it is only ever the current instruction that is decrypted and executed.

This means that plaintext information is present in the processor core to a minimal extent only.

The respective instruction data key is preferably a nonce allocated to the instruction.

The nonce is preferably a random value. This means, in particular, that there is no relation between the notices and the address of the instruction, making it impossible to predict the instruction data key without knowing the key. A 16-bit nonce is sufficient in a 16-bit processor architecture, because each address can then be allocated a different nonce.

An advantageous method for encrypting the instructions is one which allows the decryption unit to decrypt the instructions at the same speed as the processing speed of the processor core. To achieve this aim, the respective instruction is block encrypted in one embodiment by an encryption cipher, which is preferably symmetric, using the program data key and the respective instruction data key. In this embodiment, the decryption unit contains a block decryption stage having a symmetric decryption cipher which is configured to receive the program data key, on the one hand, and the respective instruction data key of the preceding instruction, on the other, and therewith to provide an intermediate data key for decrypting the current instruction to be decrypted.

When using block encryption, a block length based on the block encryption is not identical, in some embodiments, to the total length of the instruction data word and the instruction data key. However, it is preferred that the instruction data key as such is always shorter than the block size of the cipher. In such embodiments, the decryption unit preferably has a padding stage which is configured to extend the respective received instruction data key, which is shorter in length than the block length of the cipher, to the block length of the cipher by means of a predetermined padding code.

In some embodiments, the block size of the cipher is smaller than the total length of an instruction, that is, than the total length of an instruction data word and an instruction data key. In that case, the intermediate data key is produced from the cipher by providing several blocks in succession, in order to generate, as a result, the required length of the intermediate key for decryption. In such embodiments, the respective instructions are preferably stream-encrypted in a counter operating mode with repeated application of the instruction data key and using a predetermined padding code. In addition, the decryption unit preferably comprises a padding stage which is configured to extend the respective received instruction data key to the block length by means of the predetermined padding code. The padding code in such variants is preferably unique to each block. In one such variant, the cipher is supplied with the instruction data key and with a predetermined padding code to be appended thereto, and in the following block with the instruction data key again and a padding code which is incremented relative to the preceding block.

In other variants, the padding code is unique to each instruction. An instruction address or a part thereof, for example, is then used as a padding code. Alternatively, the padding code is always the same, for example in the form of a predetermined bit sequence.

No special treatment is necessary in embodiments in which the block length is greater than the total length of an instruction, that is, greater than the total length of the at least one instruction data word and the instruction data key.

In embodiments which use block encryption, the decryption unit typically has an addition stage which is configured to receive in binary form and to add the intermediate data key and the instruction to be decrypted, and to provide the at least one instruction data word and the instruction data key in decrypted form using the addition result. In other words, the bits of the intermediate data key containing the instruction to be decrypted and generated with the cipher, and corresponding to the total length of the instruction, are subjected to an XOR operation in order to generate decrypted plaintext.

The instructions may be encrypted externally before feeding the program code into the cryptoprocessor. An encryption unit external to the cryptoprocessor, for example, is used for that purpose, as described further below as a second aspect of the present invention. The cryptoprocessor does not need an internal encryption unit when this approach is taken.

As an alternative, however, such an encryption unit may also be integrated in cryptoprocessor. Such embodiments allow the program code to be initially received in plaintext form, before it is stored in encrypted form in the program memory. The analysis of the program flow chart that is needed, in which the binary code is searched for jump instructions and the instruction data key of all the possible preceding instructions is entered at the jump target, requires a high level of computing capacity, which embedded systems are mostly unable to provide at present. For that reason, the instruction data keys are preferably allocated externally for cryptoprocessors in the form of embedded systems. In such embodiments, the plaintext instructions are preferably received in the form of unencrypted instruction data words in combination with the respective instruction data keys, and are transferred to the encryption unit. In one such embodiment, the cryptoprocessor has an encryption unit which is configured to receive the instructions in unencrypted form, which each comprise the at least one instruction data word and the instruction data key allocated to the respective instruction. As explained above, the instruction data key allocated in this event is the instruction data key of the respective preceding instruction whirl is to be executed immediately beforehand in accordance with the program flow chart, and the same instruction data key is allocated to the corresponding possible preceding instructions only in the event that a corresponding instruction in the program flow chart has a plurality of possible preceding instructions, the respective instruction data keys otherwise being unique to the instruction. The encryption unit is further configured to encrypt a respective instruction using the program data key and the allocated instruction data key.

In one variant of this embodiment, the encryption unit configured to modify the received instruction data key of the instructions in accordance with a predetermined calculation rule, in order to make it more difficult to carry out an attack.

In other embodiments of the cryptoprocessor, the encryption unit is additionally configured to analyze the program flow chart and the unencrypted binary program code containing the instruction data words and received for that purpose, to search for jump commands, to identify jump target instructions and to allocate to the jump target instructions the instruction data keys of all the possible preceding instructions. In this way, such high-performance cryptoprocessors can be made capable of also allocating the instruction data keys internally.

This embodiment is particularly suitable for the kind of cryptoprocessors which are able to provide a high level of computing power compared to typical embedded processor systems according to the current prior art.

In embodiments which use block encryption, the encryption unit also preferably contains a block encryption unit having a symmetric encryption cipher which is configured to receive unencrypted program code in the form of instructions and to encrypt the instructions individually using the respective program data key and the respective instruction data key. It is advantageous when the encryption unit additionally comprises a padding stage which is configured to extend the respective received instruction data key to the block length by means of a predetermined padding code. In one embodiment in which the total length of the instruction is greater than the block size of the cipher, the block encryption unit is configured to stream-encrypt the instructions in a counter operating mode and to that end to generate an intermediate data key by using the program data key, the respective instruction data key of the preceding instruction in accordance with the program flow chart, and by using the padding code. In one variant, the padding code is generated uniquely for each block.

In this cryptoprocessor, the decryption unit is preferably arranged as a hardware unit in a data path between the program memory unit and the processor core such that it cannot be circumvented. More particularly, the decryption unit is firmly integrated as hardware into the data path of the cryptoprocessor. This ensures that the decryption unit cannot be circumvented and that the processor core can only ever execute the encrypted instructions stored in the program memory unit, which are initially decrypted by the decryption unit.

The program data key and the status information are preferably stored in the decryption unit. This status information contains the counter for the counter mode, for example, or the intermediate data key which has been calculated. This information is separately secured against being read out or modified.

Different variants are possible in order to secure these data. In one variant, the cryptoprocessor has an unclonable integrated circuit portion, for example, which defines measurable, temporally constant and random parameter values. Data values of the program data key depend in this variant on the random parameter values of the unclonable integrated circuit portion. In order to access the program data key, the cryptoprocessor in one implementation of this variant has a measurement unit which is configured to capture the aforementioned parameter values of the integrated circuit portion and to provide them in the form of digital parameter values as the program data key. It is possible to use other solutions, known per se, in order to secure the key data According to a second aspect of the invention, an encryption unit for instructions of a program code is provided, which is based on a program flow chart. The encryption unit is configured to add an instruction data key allocated to the respective instruction to received instructions each comprising at least one instruction data word, to encrypt a respective instruction using the program data key and the instruction data key of the respective preceding instruction which is to be executed immediately beforehand in accordance with the program flow chart, and to allocate the same instruction data key to the corresponding possible preceding instructions only in the event that a corresponding instruction in the program flow chart has a plurality of possible preceding instructions, wherein the respective instruction data keys are otherwise unique to the instruction.

The encryption unit according to the second aspect of the present invention shares the basic concept of the cryptoprocessor according to the first aspect of the invention. In some embodiments, it forms a hardware unit which is separate from the cryptoprocessor described here, thus allowing cryptoprocessors according to the first aspect of the invention to be implemented without an integrated encryption unit. As already explained above, the encryption unit is integrated in other embodiments of the cryptoprocessor.

As has already been explained at length above, the encryption unit according to the second aspect allows the individual instructions of the program code to be encrypted in such a way that an instruction can only be used by the processor core of the cryptoprocessor if the preceding instruction was executed immediately beforehand. According to the invention, this requires that the preceding instruction was first decrypted and thus that the instruction data key contained therein is available to decrypt the current instruction. The encryption unit thus allows the concept of intrinsic code attestation described in the foregoing to be implemented, by ensuring, by means of the encryption performed in accordance with the invention in order to defend against the return-to-libc attacks mentioned above, that the cryptoprocessor cannot depart during program execution from the program path defined by the program flow chart and implemented in the program code.

In one embodiment of the encryption unit, this one encryption unit contains a block encryption unit having a symmetric cipher which is configured to receive unencrypted program code in the form of instructions and to encrypt the instructions individually using the respective program data key and the respective instruction data key. The encryption unit preferably has a padding stage which is configured to extend the respective received instruction data key, which is preferably but not necessarily shorter in length than the block length of the cipher, to the block length of the cipher by means of a predetermined padding code.

In embodiments in which the instruction length, that is to say the total length of the instruction data word and the instruction data key, is greater than the block length, the block encryption unit is advantageously configured to stream-encrypt the instructions in a counter operating mode as already explained above in connection with decryption, and to that end to generate an intermediate data key by using the program data key, the respective instruction data key of the preceding instruction in accordance with the program flow chart, and by using the respective padding code. This intermediate data key, which is basically unique to each instruction but with the aforementioned exceptions, is then used to encrypt the instructions.

According to a third aspect of the invention, a decryption unit is provided for instructions of a program code based on a program flow chart, which are encrypted using an encryption unit according to the second aspect. The decryption unit is configured to receive the encrypted instructions individually and to decrypt a respective received encrypted instruction using the program data key and the instruction data key of the corresponding preceding instruction, to output the at least one currently thus decrypted data word of the instruction, and to have the currently decrypted instruction data key available to be used in the decryption of the next received encrypted instruction.

In preferred embodiments, as explained above, the decryption unit is an integrated component of a cryptoprocessor according to the first aspect of the invention. In principle, however, it may also be produced as a hardware unit which is separate from the cryptoprocessor and which is to be connected to the latter via an interface in order to allow the cryptoprocessor to operate. This variant is also suitable for cryptoprocessors, for example, which have variable-length instructions, the length of which is not detected until they are actually executed. In this case, decryption must be carried out accordingly in steps.

Further aspects of the invention shall now be described. According to a fourth aspect, a method for operating an encryption unit for encrypting instructions in accordance with a program flow chart on which the program code is based, is provided, said method comprising the steps of
providing and adding received instructions each comprising least one instruction data word, and an instruction data key allocated to the respective instructor,
encrypting a respective instruction using a program data key which is identical for all instructions and using the instruction data key of the respective preceding instruction which is to be executed immediately beforehand accordance with the program flow chart, and
allocating the same instruction data key to the corresponding possible preceding instructions only in the event that a corresponding instruction in the program flow chart has a plurality of possible preceding instructions, wherein the respective instruction data keys are otherwise unique to the instruction.

According to a fifth aspect of the invention, a method for operating a decryption unit is provided for decrypting instructions of a program code based on a program flow chart, which are encrypted using an encryption unit according to the fourth aspect, said method comprising the steps of
receiving the encrypted instructions individually, instruction by instruction;
decrypting a respective received encrypted instruction using the program data key and the instruction data key of the corresponding preceding instruction;
having the currently decrypted instruction data key available to be used in the decryption of the next received encrypted instruction; and
outputting the at least one currently decrypted instruction data word for execution by a processor core.

According to a sixth and final aspect of the invention, a method for operating a cryptoprocessor is provided, the cryptoprocessor comprising a processor core for executing instructions of a program code based on a program flow chart, wherein the respective instructions contain at least one instruction data word and an instruction data key allocated to the respective instruction, said method comprising the steps of
storing the instructions in an individually encrypted format, wherein a respective instruction is encrypted using a program data key and the instruction data key of a respective preceding instruction which is to be executed immediately beforehand in accordance with the program flow chart, and wherein the same instruction data key is allocated to the corresponding possible preceding instructions only in the event that a corresponding instruction in the program flow chart has a plurality of possible preceding instructions, the respective instruction data keys otherwise being unique to the instruction;
providing the stored encrypted instructions individually, instruction by instruction;
decrypting a respective received encrypted instruction using the program data key and the instruction data key of the corresponding preceding instruction;
having the currently decrypted instruction data key available to be used when decrypting the next encrypted instruction, and
reception and execution of the at least one currently decrypted instruction date word by a processor core.

BRIEF DESCRIPTION OF THE DRAWINGS

Further embodiments of the various aspects of the invention shall be described in the following with reference to the Figures, in which.

DETAILED DESCRIPTION

Figure 1:
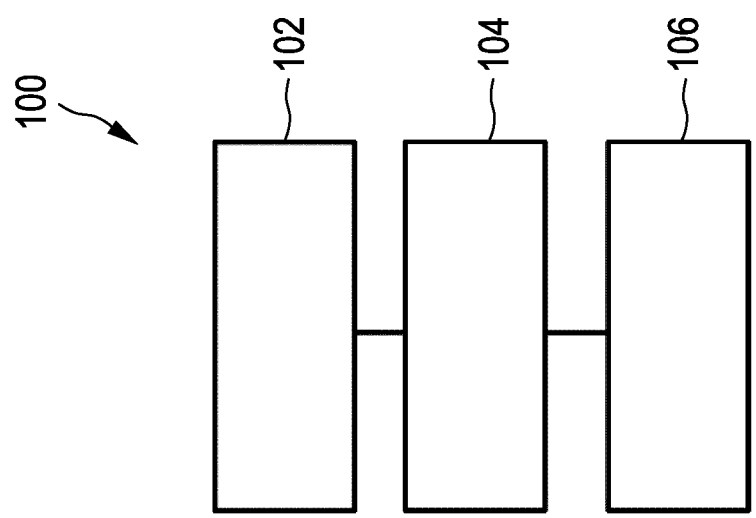
FIG. 1 shows a simplified block diagram of an embodiment of a cryptoprocessor.

FIG. 1 shows a simplified block diagram of an embodiment of a cryptoprocessor 100 featuring intrinsic code attestation. FIG. 1 is simplified to the extent that cryptoprocessor interfaces for interaction with external devices are not shown. Details of the various units within the cryptoprocessor have also been left out.

Cryptoprocessor 100 is configured as a monolithically integrated circuit. In one embodiment, the cryptoprocessor is a microcontroller. Microcontrollers are often provided as embedded systems in electronic equipment that is typically mobile, and for that reason must have a low power consumption. Currently available and used microcontrollers with low power consumption use a simple von Neumann or Harvard architecture having a single address space. Mechanisms for implementing systems that are not only secure, but also reliable are basically unavailable in the prior art for this class of microcontrollers. With the increasing importance and general accessibility of embedded systems, the need for security and reliability for such microcontrollers is also growing. The cryptoprocessor of FIG. 1, in contrast, is characterized in that it has a decryption unit 104, in addition to a program memory unit 102 and a processor core 106, which are already known per se. The program memory unit is connected as a hardware unit in the data path between program memory unit 102 and processor core 106. Program memory unit 102 stores a program code containing executable instructions in an individually encrypted format. The respective instructions contain at least one instruction data word and an instruction data key allocated to the respective instruction.

Figure 7:
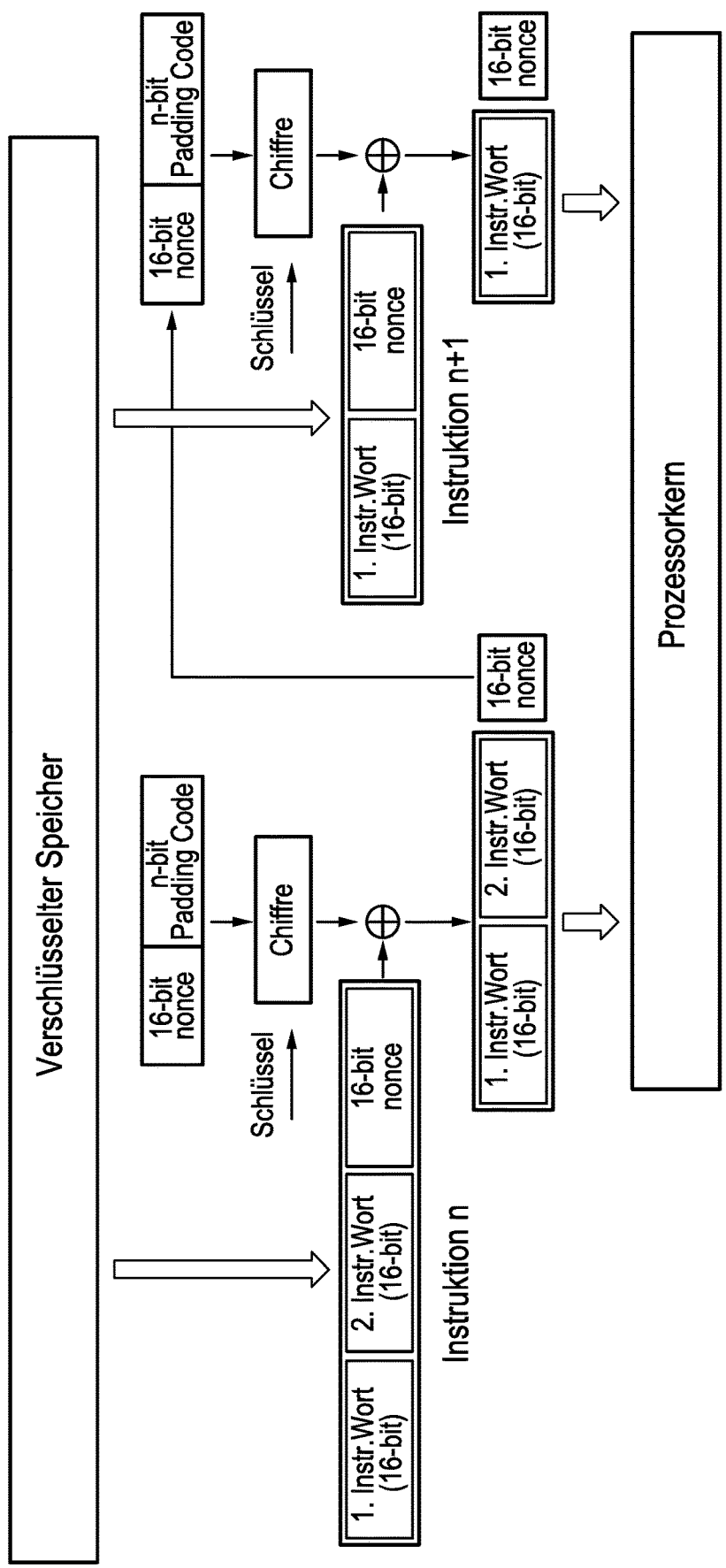
FIG. 7 shows an illustration illustrating an example of a method for operating a cryptoprocessor according to the present invention.

With regard to the data structure of the instructions, additional reference is now made to FIG. 7 and to the two instructions shown there by way of example, namely an "instruction n" and an "instruction n+1". The "instruction n" shown there in schematic form contains two instruction data words, namely "instruction word 1" and "instruction word 2", and an instruction data key in the form of a nonce unique to each instruction. "Instruction n+1", likewise shown in FIG. 7, contains merely a single "instruction word" and likewise, in addition, a nonce which is unique to that instruction. In the cryptoprocessor shown in FIG. 1, the instruction words are 16 bits long. The word length in other cryptoprocessors may have a different value. In the case under consideration here, the nonce is also 16 bits long. The length of the nonce is typically the same as that of the instruction data words.

Instructions having this kind of structure are stored in encrypted form in program memory unit 102. Thus, a respective instruction is encrypted using a program data key which is used in all the instructions of the program code, and using the instruction data key of a respective preceding instruction which is to be executed immediately beforehand in accordance with the program flow chart. In other words, to use the example of FIG. 7: The instruction data key which is used for encrypting the "instruction n+1" is the unencrypted nonce of "instruction n", so it is only with the aid of the nonce of "instruction n" that "instruction n+1" can be decrypted and thus made executable for processor core 106.

The same instruction data key is allocated to the corresponding possible preceding instructions only in the event that a corresponding instruction in the program flow chart has a plurality of possible preceding instructions. The respective instruction data keys are otherwise unique to the instruction.

Figures 5, 6:
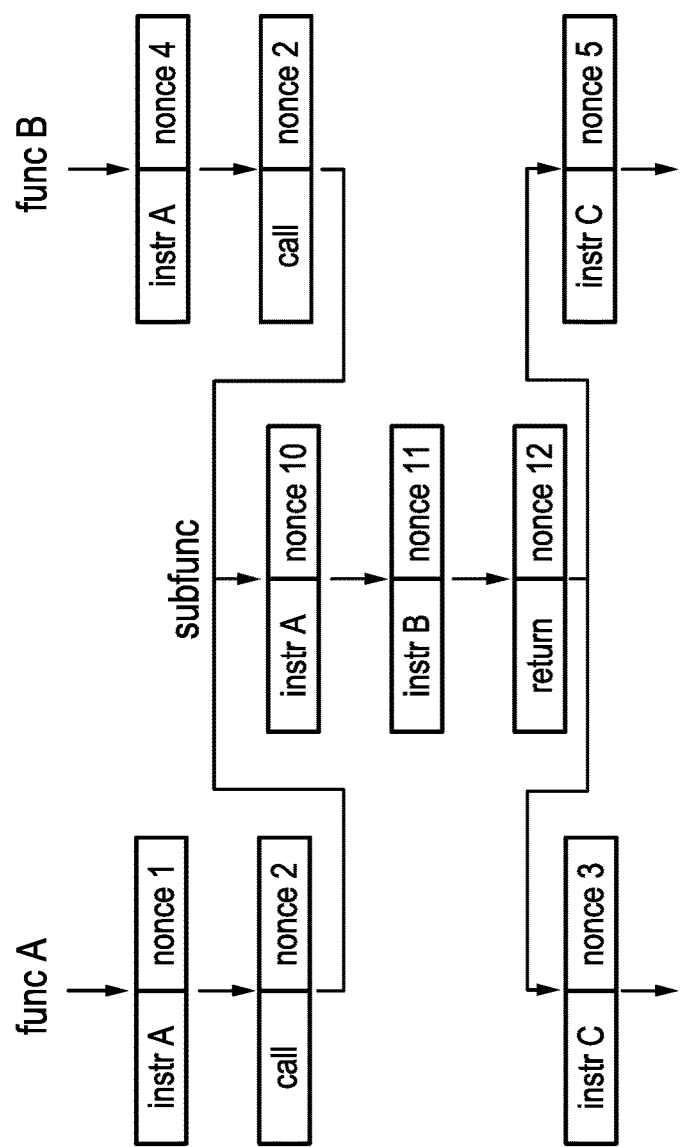
FIG. 5 shows an illustration illustrating the allocation of instruction data keys to instructions with reference to a program flow chart.
FIG. 6 shows another illustration illustrating the allocation of instruction data keys to instructions with reference to a program flow chart.

Since a program sequence is not entirely sequential as a rule, due to branching and function calls, an instruction may have more than one preceding instruction. To explain this special aspect of program code encryption, reference is additionally made to FIGS. 5 and 6. FIGS. 5 and 6 each show an illustration illustrating the allocation of instruction data keys to instructions, with reference to a program flow chart. FIG. 5 shows a detail of a program flow chart as a sequence, symbolized by arrows, of four instructions A to D. Each instruction has an instruction data word, marked "instr A" through "instr D", respectively, and a nonce allocated to that instruction. The arrangement of the arrows indicates that instruction D has two possible preceding instructions. It is possible to jump to instruction D either from instruction A or from instruction C. For that reason, both of the instructions A and C, as possible preceding instructions of instruction D, are allocated the same nonce, marked "nonce 1". This ensures that instruction can be decrypted correctly, regardless of whether it is executed immediately after instruction A or immediately after instruction C. The situation is similar in FIG. 6, but there a subfunction marked "subfunc" can be called from two different functions, namely from "func A" and from "func B". Each of the two functions "func A" and "func B" has a call command which is encrypted with the same nonce marked "nonce 2" in the context of FIG. 6. This ensures that the first instruction of the "subfunc" subfunction, namely the topmost instruction marked "instr A" in the program flow chart, is always decrypted with the correct instruction data key, namely with the "nonce 2" data word which was also used to encrypt the "instr A" instruction, of the "subfunc" subfunction. None of the other instructions has this special feature, that is to say, no other instruction contains an instruction data key, unique to the instruction, in the form of nonces "nonce 1" and "nonce 3" to "nonce 12". As shown in FIG. 6, the nonce for the callee instruction is attached to all the caller instructions. On returning to the function, the instruction after the caller instruction must be encrypted with the nonce of the callee's return command. Due to this rigid link between the caller and the callee, support cannot be provided for dynamic function calls of the kind used in function indicators and polymorphy. The use of ICA must do without both of those constructs.

The following description refers again to FIG. 1, and specifically to the way in which decryption unit 104 works. The decryption unit is configured to receive the encrypted instructions from program memory unit 102 and to decrypt a respective received encrypted instruction using the non-unique program data key and the instruction data key for the corresponding preceding instruction, which with some exceptions as explained above is unique to that instruction.

The currently decrypted at least one instruction data word the instruction is provided by decryption unit 104 to processor core 106 for execution of the instruction. Decryption unit 104 has the currently decrypted instruction data key available to be used in the decryption of the next received encrypted instruction. To do so, it uses an intermediate data storage, for example, such as a register. It is only ever necessary to have one instruction data key available, namely the one which is required to decrypt the instruction to be decrypted immediately afterwards.

Processor core 106 thus receives unencrypted instruction data words from decryption unit 104. It does not receive the instruction data key which is additionally included in the encrypted instructions. In the present embodiment, the instruction data words are received individually, instruction by instruction, such that the processor core only ever receives the data words of the current instruction to be executed, and does not receive the data word or the data words of the next instruction to be executed until execution of the current instruction has already begun. Decryption unit 104 is also configured to provide the currently decrypted instruction individually to the processor core for executing the instruction and to not decrypt a next instruction until after the instruction provided immediately beforehand has been completely decoded by the processor core. The processor has thus processed the previously provided instruction to the extent that its controller has selected an operating unit, a data source and a data target. To perform those steps, the instructions must already be decrypted in the decoding process. By providing the instructions individually, as described, the plain text of instructions in the cryptoprocessor is kept at all times to the necessary minimum of only one current instruction to be executed.

The "intrinsic code attestation (ICA)" implemented in this manner ensures that the program code can be read and also that the system is protected against manipulation. Decrypting the program code in the manner described above maintains protection of the program code contained in program memory unit 102, even when the entire contents of the latter are read out. This encryption also provides intrinsic protection against return-to-libc attacks. This means that the program code is protected against unauthorized reading and against any undesired manipulation of the execution path.

Decryption unit 104 is integrated as a fixed element in the data path of cryptoprocessor 100, as explained above. This ensures that the decryption unit cannot be circumvented and that processor core 106 can only ever execute the encrypted instructions stored in the program memory unit.

In order to determine the instruction data key in accordance with the program flaw chart, the program to be encrypted must be subjected to control flow analysis after it has been translated. That analysis can be performed after generating an intermediate code, for example. The instructions can be subsequently extended with the nonces allocated to them, and the final transformation into ISA-specific machine code can be carried out. In the embodiment shown in FIG. 1, encryption is performed after the machine code has been generated on an external host system belonging to cryptoprocessor 100. The encrypted machine code is then loaded into program memory unit 102. These steps are typically performed at a manufacturer of the cryptoprocessor itself or (usually) at a manufacturer of an appliance containing the cryptoprocessor.

Figure 2:
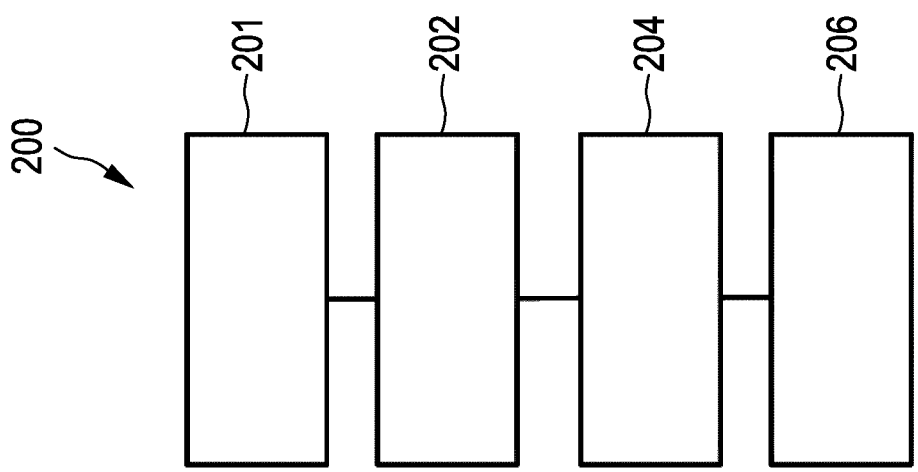
FIG. 2 shows a simplified block diagram of another embodiment of a cryptoprocessor.

As an alternative to the embodiment shown in FIG. 1, FIG. 2 shows a simplified block diagram of a further embodiment of a cryptoprocessor 200. Cryptoprocessor 200 differs specifically from cryptoprocessor 100 in FIG. 1 in that it integrates an encryption unit 201. Otherwise, as in the embodiment in FIG. 1, it contains a program memory unit 202, a decryption unit 204 and a processor core 206. Their functions are the same as the corresponding units in cryptoprocessor 100, which are described with reference to FIG. 1. Encryption unit 201 of cryptoprocessor 200 is configured to add an instruction data key, allocated to the respective instruction, to instructions received in unencrypted form and comprising at least one instruction data word, and to encrypt a respective instruction using the program data key and the instruction data key of the respective preceding instruction which is to be executed immediately beforehand in accordance with the program flow chart. As already explained with reference to FIGS. 5 and 6, the same instruction data key is allocated to the corresponding possible preceding instructions only in the event that a corresponding instruction in the program flow chart has a plurality of possible preceding instructions, the respective instruction data keys otherwise being unique to the instruction. The encryption unit is further configured to output the instructions thus encrypted to program memory unit 202, where they are stored.

In cryptoprocessor 200, encryption is thus carried out on cryptoprocessor 200 itself, after the program text has been loaded into it.

Figure 3:
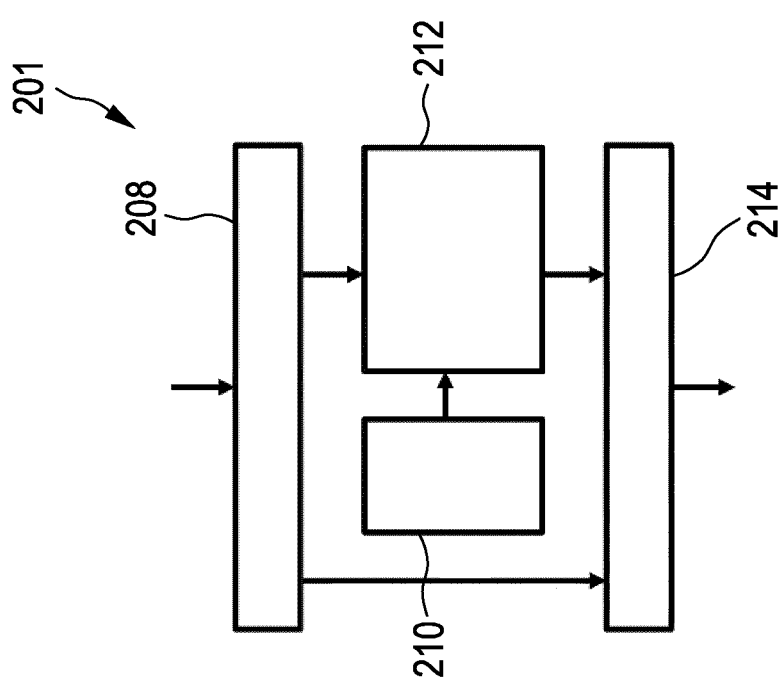
FIG. 3 shows a simplified block diagram embodiment of an encryption unit.

An embodiment of an encryption unit shall now be described with reference to FIG. 3. FIG. 3 shows a simplified block diagram of an embodiment of encryption unit 201, of the kind that can be used in cryptoprocessor 200. In an input stage 208, encryption unit 201 receives unencrypted program code in the form of instruction data words of individual instructions. The length of the instructions is specified by the instruction set architecture of the processor, which means there can only be one data word per instruction in some embodiments, or at least two instruction data words per instruction in other embodiments. Input stage 208 adds respective instruction data keys to the received instruction data words in accordance with the allocation rule described with reference to FIGS. 5 and 6, which is unique to each instruction as a basic principle, but with defined exceptions.

A program data key is provided by an unclonable integrated circuit portion 210 as a physically unclonable function (PUF), so called. Such circuit portions, unique to the respective processor, as known per se, so a more detailed description of circuit portion 210 can be dispensed with here. However, mention should be made of the fact that a PUF is used only on cryptoprocessors which contain the encryption unit as an integrated unit. This means that, in order to use a PUF, the program text has to be encrypted locally before it is stored in the memory. Using a PUF has the advantage that a program image cannot be transferred to another system without prior re-encryption.

If there is no encryption unit in the cryptoprocessor, as in the example shown in FIG. 1, other methods for generating and storing the program data key securely against unauthorized access in the cryptoprocessor are used, and are known per se.

In order to implement a block encryption unit, encryption unit 201 also contains a symmetric cipher 212 which is configured to receive the unencrypted received program code in the form of instruction data words and to stream-encrypt the instruction data words individually, by block encryption in the counter operating mode, using the respective program data key and the respective instruction data key. Symmetric ciphers are generally very efficient and provide a high level of security. However, these ciphers process blocks of a fixed size only. In most systems, the instructions do not match that block size. This means that a block length on which encryption is based is smaller or greater than a length of the instructions (but not necessarily).

As already explained, it makes sense if the instruction data key as such is shorter than the block length of the cipher. In order to compensate for a block length which is greater than the length of the instruction data key, input stage 208 in FIG. 3 includes a padding stage, not shown in further detail, which is configured to extend the respectively generated instruction data key to the predefined block length by means of a predetermined padding code.

In addition to the program data key, the respective instruction data key of the preceding instruction according to the program flow chart is used with the respective padding code to generate an intermediate data key in symmetric cipher 212, so that the block encryption unit can stream-encrypt instructions in counter operating mode which are longer in total, including the length of the instruction data key, than the length of the block cipher. In order to produce an intermediate data key with a matching length, several blocks generated by the cipher and, where necessary, a portion of a last block are appended to each other until the total length is exactly the matching number of bits. Each block contains the respective instruction data key and the respective padding code. In one implementation, the only difference between the padding codes of successive blocks is that the padding code is incremented from one block to the next.

This intermediate data key is then outputted to an addition stage 214. Addition stage 214 generates an encrypted instruction for storage in the program memory unit of the cryptoprocessor by adding the intermediate data key (in an XOR operation) to the instruction data word which has been extended by the instruction data key of the preceding instruction and the padding code, and received from input stage 208.

Figure 4:
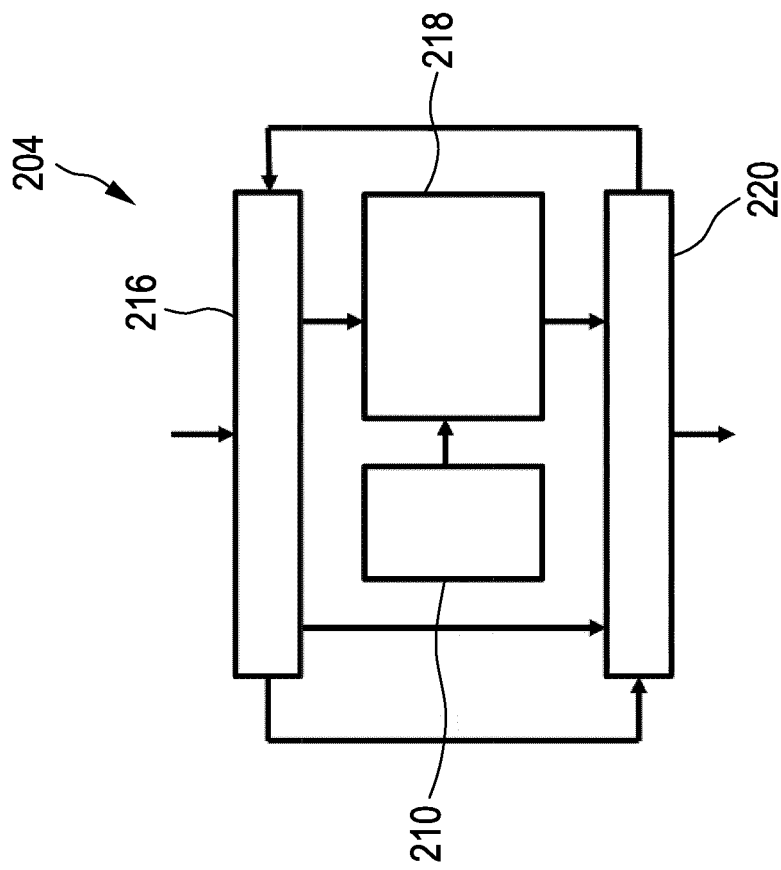
FIG. 4 shows a simplified block diagram of an embodiment of a decryption unit.

An embodiment of a decryption unit shall now be described with reference to FIG. 4. FIG. 4 shows a simplified block diagram of an embodiment of decryption unit 204, of the kind that can be used in cryptoprocessor 200.

The respective instructions received by decryption unit 204 are block-encrypted using the program data key and the respective instruction data key by a symmetric encryption cipher, as has just been described with reference to FIG. 3. Decryption unit 204 contains an input stage 216 and a symmetric cipher 218 corresponding to the cipher of the encryption unit. The input stage receives the current instruction to be encrypted from program memory unit 202 shown in FIG. 2. It also receives a decrypted instruction data key from an output stage 220. The input stage contains a padding stage, of the kind that is also provided in the encryption unit. The padding stage extends the instruction data key by the padding code, which is generated in an identical manner to the encryption process for the respective instruction, due to the rule for generating the padding code. Only when the total length of the instruction data words and the instruction data key of the instructions is greater than the block size of symmetric cipher 218 is a ciphertext stream generated (counter mode).

With the aid of the instruction data key of the preceding instruction, extended by the padding code, and of the program data key provided by the unclonable circuit portion 210, symmetric cipher 218 generates, in the same manner as symmetric cipher 212, an intermediate data key which is supplied to an output stage 220. The tatter contains an addition stage which decrypts, with the aid of the intermediate data key thus generated and by summation (in an XOR operation), the current instruction to be decrypted, which is likewise supplied to it on the input side. The output stage then splits off the decrypted instruction data key and provides it to input stage 216 to allow the next instruction to be decrypted. Addition can be carried out bit-wise. The at least one instruction data word and the instruction data key can thus be decrypted in steps.

FIG. 7 shows an illustration illustrating an example of a method for operating a cryptoprocessor according to the present invention.

In the ICA approach shown here, the individual instructions, such as "instruction n" and "instruction n+1" of the program text already described in some detail, are encrypted in such a way that an instruction can be used only if the instruction preceding it was decrypted and thus executed immediately beforehand.

In order to prevent the return-to-libc attacks mentioned at the outset, ICA is used to ensure that there can be no departure from the program path during program execution. This ensures that instruction n+1 can be executed only if instruction n was executed beforehand. A linkage between the instructions is thus introduced. This cryptographic linkage between the instructions produces a dependence that results in verifiability of the correct order of program text blocks being an intrinsic characteristic of the processor core. If there is any departure from the predefined program path, the processor core will inevitably be given instructions which have been wrongly decrypted and which cannot then be executed.

In the example shown in FIG. 7, each instruction is extended by a nonce which is used as an input for decrypting the instruction that follows. The nonce is encrypted in combination with the preceding instruction. Each instruction is extended with a random, unique nonce. The nonce must be sufficiently long for cryptographic purposes, so that no collisions occur. The length of the nonce may be smaller or greater, depending on the processor. A 16-bit nonce, for example, should be sufficient in a 16-bit processor architecture, because each address could then be allocated a different nonce. The nonces bear no relation to the instruction address and must be generated randomly, so that it is impossible to predict them without knowledge of the key.

The block cipher is also operated in counter mode in the example shown in FIG. 7, where the nonce is used as input for the cipher. The nonce is extended to the block size of the block cipher by means of a counter. The counter is initialized with the address of the instruction. In order to decrypt the instruction, the result of the cipher is added to the program text (e.g. modulo 2 addition). This means that the ICA is not bound to the block size of a block cipher and can also be used in instruction set architectures (ISAs) with variable-length instructions.

To summarize, according to the present invention individual instructions of the program code are encrypted in such a way that an instruction can be used by the processor core only if the instruction preceding it, referred to here as the preceding instruction, was executed immediately beforehand. According to the invention, this requires that the preceding instructions were first decrypted and thus that the instruction data key contained therein is available to decrypt the current instruction. This cryptographic linkage between the instructions produces a dependence that lends the processor core an intrinsic ability to verify that the instructions are executed in the correct order in accordance with the desired program flow chart on which the program code is based.

What is claimed is:

1. A cryptoprocessor, comprising:
a processor core for receiving and executing instructions of a program code based on a program flow chart;
a program memory unit which stores the program code with instructions in an individually encrypted format, wherein
the respective instructions contain at least one instruction data word and an instruction data key allocated to the respective instruction,
a respective instruction is encrypted using a program data key and the instruction data key of a respective preceding instruction which is to be executed immediately beforehand in accordance with the program flow chart, and wherein
the same instruction data key is allocated to the corresponding possible preceding instructions only in the event that a corresponding instruction in the program flow chart has a plurality of possible preceding instructions, the respective instruction data keys otherwise being unique to the instruction; and
a decryption unit which is configured to receive the encrypted instructions from the program memory unit and to decrypt a respective received encrypted instruction using the program data key and the instruction data key of the corresponding preceding instruction, to transfer the at least one currently thus decrypted data word of the instruction to the processor core for executing the instruction, and to have the currently thus decrypted instruction data key available to be used in the decryption of the next received encrypted instruction; wherein
the respective instruction is block encrypted by a symmetric encryption cipher using the program data key and the respective instruction data key, and
the decryption unit contains a block decryption stage having a symmetric decryption cipher which is configured to receive the program data key and the respective instruction data key of the preceding instruction and therewith to provide an intermediate data key for decrypting the current instruction to be decrypted; wherein
the decryption unit additionally comprises a padding stage which is configured to extend the respective received instruction data key to the block length by means of the predetermined padding code; wherein
the cryptoprocessor additionally comprises an encryption unit which is configured
to receive the respective instructions having at least one instruction data word and the instruction data key allocated to the respective instruction, and
to encrypt a respective instruction using the program data key and the instruction data key of the respective preceding instruction which is to be executed immediately beforehand in accordance with the program flow chart; and wherein the encryption unit contains a block encryption unit having a symmetric encryption cipher which is configured to receive unencrypted program code in the form of instructions and to encrypt the instructions individually using the respective program data key and the respective instruction data key, the encryption unit additionally comprises a padding stage which is configured to extend the respective received instruction data key to the block length by means of a respective predetermined padding code, and wherein the block encryption unit is configured to stream-encrypt the instructions in a counter operating mode and to that end to generate an intermediate data key by using the program data key, the respective instruction data key of the preceding instruction in accordance with the program flow chart, and by using the respective padding code.

2. The cryptoprocessor according to claim 1, in which the decryption unit is configured to provide the currently decrypted instruction individually to the processor core for executing the instruction and to not decrypt a next instruction until after the instruction provided immediately beforehand has been completely decoded by the processor core.

3. The cryptoprocessor according to claim 2, in which the respective instruction data key is a nonce allocated to the instruction.

4. The cryptoprocessor according to claim 1, in which the decryption unit has an addition stage which is configured to receive in binary form and to add the intermediate data key and the instruction to be decrypted and to provide the at least one instruction data word and the instruction data key in decrypted form using the addition result.

5. The cryptoprocessor according to claim 1, in which the decryption unit is arranged as a hardware unit which cannot be circumvented in a data path between the program memory unit and the processor core.

6. The cryptoprocessor according to claim 5, having
an unclonable integrated circuit portion which defines measurable, temporally constant and random parameter values, and in which
data values of the program data key depend on the random parameter values of the unclonable integrated circuit portion.

7. An encryption unit for instructions of a program code based on a program flow chart, wherein said encryption unit is coupled to a memory and further comprises
an input stage that is configured to add an instruction data key allocated to the respective instruction to received instructions each comprising at least one instruction data word,
wherein the encryption unit is configured:
to encrypt a respective instruction using a program data key and the instruction data key of the respective preceding instruction which is to be implemented immediately beforehand in accordance with the program flow chart, and
to allocate the same instruction data key to the corresponding possible preceding instructions only in the event that a corresponding instruction in the program flow chart has a plurality of possible preceding instructions, wherein the respective instruction data keys are otherwise unique to the instruction
the encryption unit containing a block encryption unit having a symmetric cipher which is configured to receive, via the input stage, unencrypted program code in the form of instructions and to encrypt the instructions individually using the respective program data key and the respective instruction data key,
having a padding stage which is configured to extend the respective received instruction data key to the block length by means of a predetermined padding code, wherein
the block encryption unit is configured to stream-encrypt the instructions in a counter operating mode and to that end to generate an intermediate data key by using the program data key, the respective instruction data key of the preceding instruction in accordance with the program flow chart, and by using the respective padding code.

8. A decryption unit for instructions of a program code based on a program flow chart, which are encrypted using an external encryption unit according to claim 7, wherein the decryption unit comprises:
an input stage that is configured to receive the encrypted instructions individually;
and wherein the decryption unit is configured to decrypt a respective received encrypted instruction using the program data key used by the encryption unit according to claim 7 and the instruction data key of the corresponding preceding instruction, to output the at least one currently thus decrypted data word of the instruction, and to have the currently decrypted instruction data key available to be used in the decryption of the next received encrypted instruction.

9. A method for operating an encryption unit for encrypting instructions in accordance with a program flow chart on which the program code is based, said method comprising the steps of
providing and adding an instruction data key allocated to the respective instruction to received instructions each comprising at least one instruction data word,
encrypting a respective instruction using a program data key which is identical for all instructions and using the instruction data key of the respective preceding instruction which is to be executed immediately beforehand in accordance with the program flow chart;
allocating the same instruction data key to the corresponding possible preceding instructions only in the event that a corresponding instruction in the program flow chart has a plurality of possible preceding instructions, wherein the respective instruction data keys are otherwise unique to the instruction;
receiving unencrypted program code in the form of instructions and encrypting the instructions individually using the respective program data key and the respective instruction data key,
extending the respective received instruction data key to the block length by means of a predetermined padding code; and
stream-encrypting the instructions in a counter operating mode and to that end generating an intermediate data key by using the program data key, the respective instruction data key of the preceding instruction in accordance with the program flow chart, and by using the respective padding code.

10. A method for operating a decryption unit for decrypting instructions of a program code based on a program flow chart, which are encrypted using an encryption unit according to claim 9, said method comprising the steps of
receiving the encrypted instructions individually, instruction by instruction;

decrypting a respective received encrypted instruction using the program data key and the instruction data key of the corresponding preceding instruction, having the currently decrypted instruction data key available to be used in the decryption of the next received encrypted instruction;

outputting the at least one currently decrypted instruction data word for execution by a processor core.

11. A method for operating a cryptoprocessor comprising a processor core for executing instructions of a program code based on a program flow chart, wherein the respective instructions contain at least one instruction data word and an instruction data key allocated to the respective instruction, said method comprising the steps of storing the instructions in an individually encrypted format, wherein a respective instruction is encrypted using a program data key and the instruction data key of a respective preceding instruction which is to be executed immediately beforehand in accordance with the program flow chart, and wherein the same instruction data key is allocated to the corresponding possible preceding instructions only in the event that a corresponding instruction in the program flow chart has a plurality of possible preceding instructions, the respective instruction data keys otherwise being unique to the instruction;

providing the stored encrypted instructions individually, instruction by instruction;

decrypting a respective received encrypted instruction using the program data key and the instruction data key of the corresponding preceding instruction;

having the currently decrypted instruction data key available to be used when decrypting the next encrypted instruction, and reception and execution of the at least one currently decrypted instruction data word by a processor core, said method further including the steps of block encrypting the respective instruction by a symmetric encryption cipher using the program data key and the respective instruction data key, receiving the program data key and the respective instruction data key of the preceding instruction and therewith providing an intermediate data key for decrypting the current instruction to be decrypted;

extending the respective received instruction data key to the block length by means of the predetermined padding code;

receiving the respective instructions having at least one instruction data word and the instruction data key allocated to the respective instruction, encrypting a respective instruction using the program data key and the instruction data key of the respective preceding instruction which is to be executed immediately beforehand in accordance with the program flow chart;

receiving unencrypted program code in the form of instructions and encrypting the instructions individually using the respective program data key and the respective instruction data key, extending the respective received instruction data key to the block length by means of a respective predetermined padding code, and stream-encrypting the instructions in a counter operating mode and to that end, generating an intermediate data key by using the program data key, the respective instruction data key of the preceding instruction in accordance with the program flow chart, and by using the respective padding code.

12. The cryptoprocessor according to claim 1, in which the respective instruction data key is a nonce allocated to the instruction.

13. The cryptoprocessor according to claim 4, in which the decryption unit has an addition stage which is configured to receive in binary form and to add the intermediate data key and the instruction to be decrypted and to provide the at least one instruction data word and the instruction data key in decrypted form using the addition result.

14. The cryptoprocessor according to claim 1, additionally comprising an encryption unit which is configured to receive the respective instructions having at least one instruction data word and the instruction data key allocated to the respective instruction, and to encrypt a respective instruction using the program data key and the instruction data key of the respective preceding instruction which is to be executed immediately beforehand in accordance with the program flow chart.

* * * * *